United States Patent [19]
Akatsuka

[11] Patent Number: 5,565,895
[45] Date of Patent: Oct. 15, 1996

[54] PROGRAMMABLE CONTROLLER WITH INDEPENDENT DISPLAY

[75] Inventor: Narihiro Akatsuka, Aichi, Japan

[73] Assignee: Mitsubishi Denki Kabushiki Kaisha, Tokyo, Japan

[21] Appl. No.: 832,909

[22] Filed: Feb. 7, 1992

[30]  Foreign Application Priority Data

Feb. 7, 1991 [JP] Japan .................................. 3-016524

[51] Int. Cl.$^6$ .................................................. G09G 1/02
[52] U.S. Cl. ........................................... 345/185; 395/115
[58] Field of Search .................................. 340/798, 799, 340/717, 723; 395/115, 116, 164; 345/185, 192, 193, 189, 190, 200, 201, 112

[56]        References Cited

U.S. PATENT DOCUMENTS

| | | | |
|---|---|---|---|
| 4,425,630 | 1/1984 | Yomogida et al. | 364/900 |
| 4,441,164 | 4/1984 | Panan et al. | 395/115 |
| 4,817,118 | 3/1989 | Wilburn et al. . | |
| 4,860,219 | 8/1989 | Schulz et al. | 395/116 |

FOREIGN PATENT DOCUMENTS

| | | |
|---|---|---|
| 0316609 | 5/1989 | European Pat. Off. . |
| 2100895 | 1/1983 | United Kingdom . |

OTHER PUBLICATIONS

IBM Technical Disclosure Bulletin, vol. 32, No. 9A, Feb. 1990, New York, pp. 6–11 "Processor Architecture for Measurement and Monitoring Functions".

Patent Abstracts of Japan, vol. 6, No. 171 (P–140) (1049) 4 Sep. 1982, JP-A-576-089-109 (Toyoda Koki K.K.).

Primary Examiner—Raymond J. Bayerl
Assistant Examiner—Doon Chow
Attorney, Agent, or Firm—Sughrue, Mion, Zinn, Macpeak & Seas

[57]             ABSTRACT

A programmable controller having a processor for running a control program for controlling a controllable object, such as a machine, the processor being responsive to stored internal data required for the run of the program and being operative to generate internal data from the running of the program. The internal data is displayable on a printer or other display device, on a continuous, preprogrammed or random timing basis, in response to a display controller that can read and display the internal data independently of the run of the program.

15 Claims, 6 Drawing Sheets

PROGRAMMABLE CONTROLLER WITH INDEPENDENT DISPLAY

BACKGROUND OF THE INVENTION

1. Field of the Invention

The present invention relates to a programmable controller equipped with a display function for displaying internal data processed by a control program without affecting the processing of the control program.

2. Description of the Background Art

A programmable controller (hereinafter referred to as a "PC") for program-controlling an object to be controlled lo may be equipped with at least one of a display and a printer, serving as a display device. The PC also may have a display control function which is operative to show on the display both internal data required for the run of a control program and the internal data resulting from such run, or to print such internal data on paper for monitoring.

FIG. 10 illustrates a configuration of a conventional PC equipped with a printer as a display device and a control function thereof. In the Figure, the flow directions of the internal data are indicated by arrows.

In FIG. 10, a PC unit 10 serves as a program control section. The unit includes a CPU 11 as a program processing unit (hereinafter referred to as the "program processing CPU") for running and processing a control program. CPU 11 controls all functions, including printing, and must access all programs in memory that are relevant to those functions. The unit also includes a memory 12 as an internal data storage (hereinafter referred to as the "internal data memory") for storing as the internal data of the PC both the data required for the run of the control program and the data resulting from such run. A print control unit 20 acts as a display control section and includes a print data output interface 21 for outputting the internal data in a print-compatible format to a printer 30, as mentioned later. The print control unit does not have a CPU but does include a buffer memory in the structure. The printer 30 is one several possible display units for printing the output from the print control unit 20.

In an operation of the PC, the program processing CPU 11 in the PC unit 10 runs the control program which is employed to control an object to be controlled (not illustrated). The control program includes a print program for printing program-control information on the printer 30 for monitoring purposes. When the program processing CPU 11 runs the control program, the desired internal data of the PC, which is described in the print program area of the internal data memory 12, is read out. The read data is converted into a desired format by the print program, output to the printer 30 via the print data output interface 21 of the print control unit 20, and printed by the printer 30.

The PC can employ several print formats (systems), each of which is described in the control program as a subprogram. The program processing CPU 11 outputs the internal data processed in accordance with the print format programmed in the control program, i.e. by processing the internal data and the data defining the print format, to the printer 30 via interface 21.

When such print processing is performed by the PC, a print processing program must be included in the PC control program and run by the program processing CPU 11. As a result, the selection of a print format becomes complicated. Furthermore, the print time per scan of the program as well as the PC program size increases in proportion to an increase in the amount of PC internal data to be printed. Thus, a large program control processing load is placed on the PC.

This same problem exists where the internal data is to be presented on a display. To perform the display processing, such as an indication on a display of data that is required for the run of a control program and data that results from such run, as internal data, for monitoring purposes by means of a conventional programmable controller that is configured as described above, a display processing program must be incorporated into the control program and run in the control unit thereof. As a result, the display format is complicated and the number of control program steps and the processing time of the control program are increased as the amount of the internal data to be displayed is increased. This adversely affects the efficient operation of the object to be controlled.

Where both a printing and display function are to be conducted, the complications, problems, processing time and load on the PC are further increased.

SUMMARY OF THE INVENTION

It is, accordingly, an object of the present invention to overcome the disadvantages in the conventional PC by providing a programmable controller wherein the processing time of a control program does not increase due to the display processing of data required for the run of the control program and data resulting from such run.

These and other objects of the invention are accomplished by providing a display control that is separate from and independent of the program control.

The invention further provides a display processor that can access stored data for display independent of the operation of the control processor that processes the control program.

The invention provides in the program control section a storage for internal data to be displayed, the storage being accessible by the display control section. The display control section also has storage for timing information to control the access of the display control section to the stored internal data for display, independent of the run of the control program.

Specifically, the first embodiment includes, in addition to a program control section for program-controlling an object to be controlled, a display control section which reads internal data required for the run of a control program and resulting from the run from the program control section on the basis of read timing information, without affecting the run of the control program, and processes the internal data displayable on a display device. The second embodiment includes a display control section which reads internal data from the program control section without affecting the run of the control program, stores the data into read data storing means, and processes the stored internal data displayable on the display device on the basis of display timing information, thereby eliminating display control in said display device by the control program and increasing the program control speed of the object to be controlled. The display can be in any of a continuous, random timing or programmed timing modes.

DESCRIPTION OF THE PREFERRED EMBODIMENTS

First and second embodiments of the invention may be described with reference to FIG. 1 to FIG. 9, wherein numerals identical to those in the background art indicate identical or corresponding parts.

Figure 1:
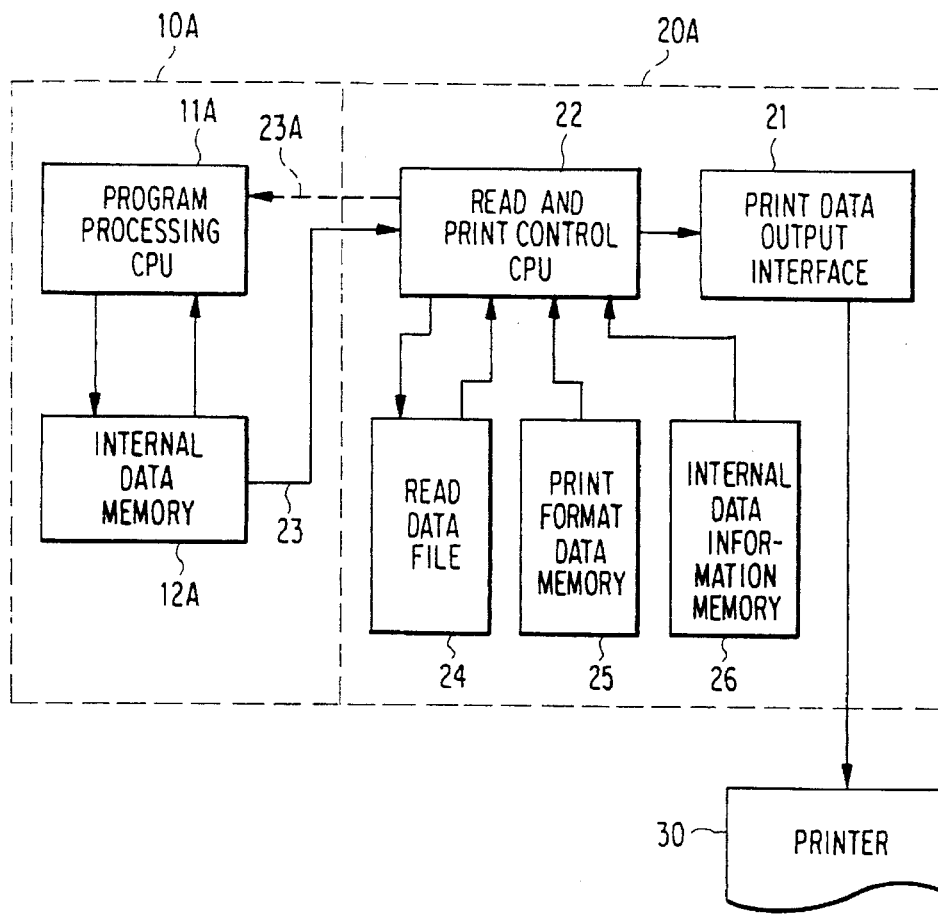
FIG. 1 is a block diagram of a programmable controller equipped with a print function according to an embodiment of the present invention.

Referring initially to FIG. 1, a PC unit comprises a program control section 10A, having a program processing CPU 11A and an internal data memory 12A, which is an internal data store. Memory 12A stores the internal data required for operating the program processing CPU 11A and the data resulting from the operation of the processing CPU 11A. The internal data memory 12A can be accessed by the program processing CPU 11A. Its data can also be read by a read-and-print control CPU 22 of a print control unit 20A, via a data bus 23. The print control unit 20A serves as a display control section for processing and controlling the internal data of PC unit 11A for display via a printer 30. Read-and-print control CPU 22 functions to read the internal data from the internal data memory 12A via the data bus 23 directly, i.e. without affecting the run of the control program by the program processing CPU 11A. CPU 22 also functions as a print processing unit, acting generally to perform display processing, i.e., for processing the read internal data into a format for use with the printer 30. A read data memory 24 is operative to store the internal data read from memory 12A. A print format data memory 25 is operative for pre-storing data on the print formats, such as display rules and fixed character information, which are fixed print information. Finally, an internal data information memory 26 is used for storing information concerning the reading and printing of the internal data. An interrupt line 23A extends from read and print control CPU 22 to program processing CPU 11A and functions in a manner to be explained subsequently.

Figure 2:
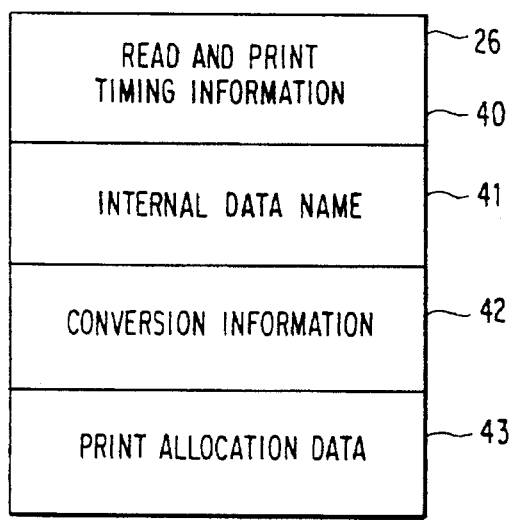
FIG. 2 is a block diagram illustrating the details of an internal data information memory shown in FIG. 1.

As shown in FIG. 2, the internal data information memory 26 comprises a read-and-print timing information storage 40 for storing timing information for the reading of the internal data from the internal data memory 12A and the printing of such data on the printer 30. The memory 26 also has an internal data name storage 41 for storing the names of such internal data, and a conversion information storage 42 for storing information such as expressions for the conversion of the units of read numerical value data. Finally, the memory 26 has a print allocation data storage 43 for storing print position information based on the print format of the data converted, i.e. print allocation data.

During operation of the PC in the first embodiment, print control in the PC is carried out by the print control unit 20A, separately from the PC unit 10A. In other words, the print control unit 20A is operative to read the internal data of the internal data memory 12A in the PC unit 10A via the bus 23. Also, print format information is already contained in the print control unit 20A. As a result, the internal data may be printed immediately after it is read, or the internal data may be written to the read data file 24 and the data stored in the file 24 may be subsequently printed in blocks with appropriate timing.

As a result of the independent display processing by control unit 20A, the control program run by the program processing CPU 11A may be written exclusively for program-controlling an object to be controlled (not illustrated), without any consideration being given to the print processing.

Data for the print formats may be pre-stored in an interactive mode into the print format data memory 25. Also, the print information, such as read and print timing information, read data names, conversion information and print allocation data, are stored respectively into the timing information storage 40, the internal data name storage 41, the conversion information storage 42 and the print allocation data storage 43. The combination of data 40–43 comprises the internal data of information memory 26.

The program processing CPU 11A in the PC unit 10A runs the control program in order to effect program-control of the object to be controlled (not illustrated), reads the internal data required for the run thereof from the internal data memory 12A in accordance with the control program, and writes the resultant data back to the internal data memory 12A. It does not control the print processing.

Meanwhile, the read and print control CPU 22 reads the internal data from the internal information memory via bus 23 and outputs print data via interface 21 to the printer 30, independently of the operation of the program processing CPU 11A. Namely, the read and print control CPU 22 reads the timing information stored in the timing information storage 40, the internal data names stored in the internal data name storage 41, and other information, and reads from the internal data memory 12A the current values of the internal data having the internal data names registered at a particular time of day or a cycle specified on the basis of the read timing information, without affecting the operation of the program processing CPU 11A. This can be accomplished by the CPU 22 issuing an interrupt to the CPU 11A via interrupt line 23A. When the interrupt is received, it is held by CPU 11A until the end of a complete program sequence, at which point the interrupt is serviced. This process permits the bus 23 to be freed for use by CPU 22 to access memory 12A and retrieve internal data stored therein. When the access operation is completed, the bus is released and the CPU 11A again resumes its operation, including running the program and reading and writing interim data in memory 12A.

The internal data of the PC read by the read and print control CPU 22 is processed using conversion expressions stored in the conversion information storage 42. Then it is converted into numerical values and character data in required print units, and is output to the printer 30 via the print data output interface 21.

Since the internal data read may be numerical value data and it may be desired to print the data in any of a variety of units on the printer 30, four function arithmetic expressions for unit conversion are stored beforehand in the conversion information storage 42 as conversion information. The read and print control CPU 22 may process the internal data using such expressions, to permit the desired units to be printed. In this manner, economization can be obtained with respect to the number of print data operating program steps in the print control program and the processing time of the print control program can be reduced.

The data may be printed out in two ways. First, the data may be output by a system wherein the internal data is printed immediately after it is read; in such case, the internal data read timing is information set beforehand in the timing information store 40 (print system A). Second, the data may be output by a system wherein the read internal data stored once in the data storage file 24 is printed in blocks at the timing specified by the print timing information (print system B).

In the print system A, the internal data is processed by the print control CPU 22 in accordance with print allocation information stored in the print allocation data storage 43 and the print format information stored in the print format data memory 25. The processed internal data is output to the printer 30 via the print data output interface 21.

Figure 3:
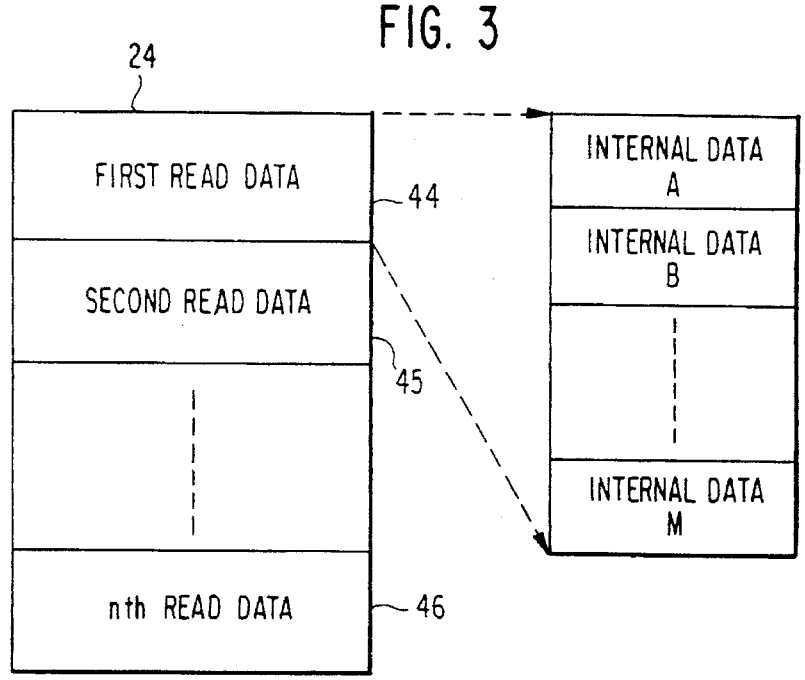
FIG. 3 is a block diagram illustrating the data storage status of a read data file.

In the print system B, the internal data read by CPU 22 is stored into the read data file 24 in a reading sequence as shown in FIG. 3. The contents of the internal data 44 stored at first data reading, e.g., information on devices, is stored in the internal data name storage 41. All names of the data stored are placed in sequence, e.g., internal data A, internal data B . . . internal data M. Every time the internal data is read, for example, a second time or a third time, it is stored in sequence in the read data file 24.

Timing information storage 40 contains an identification of specified times of day or cycles for processing internal data. When the print timing stored in the timing information storage 40 occurs, the internal data is processed in accordance with the data information stored in the print allocation data storage 43 and the print format data memory 25, and output to the printer 30 via the print data output interface 21.

As previously noted, the print allocation data storage 43 has stored, as print allocation data information, the information on which data in the read file data 24 is lo employed. Specifically, the internal data A of the first read data is used as the first print data and the internal data F of the third read data is used as the next print data. As a result, the selected data of the internal data stored in the read data file 24 is printed by the printer 30 in accordance with the print allocation data information.

A printing process by reading the internal data from the internal data memory 12A and outputting the same to the printer 30 with predetermined timing will now be described specifically with reference to FIG. 4 to FIG. 7. Printing may either be conducted at a predetermined sampling cycle or based on a random trigger.

Figure 4:
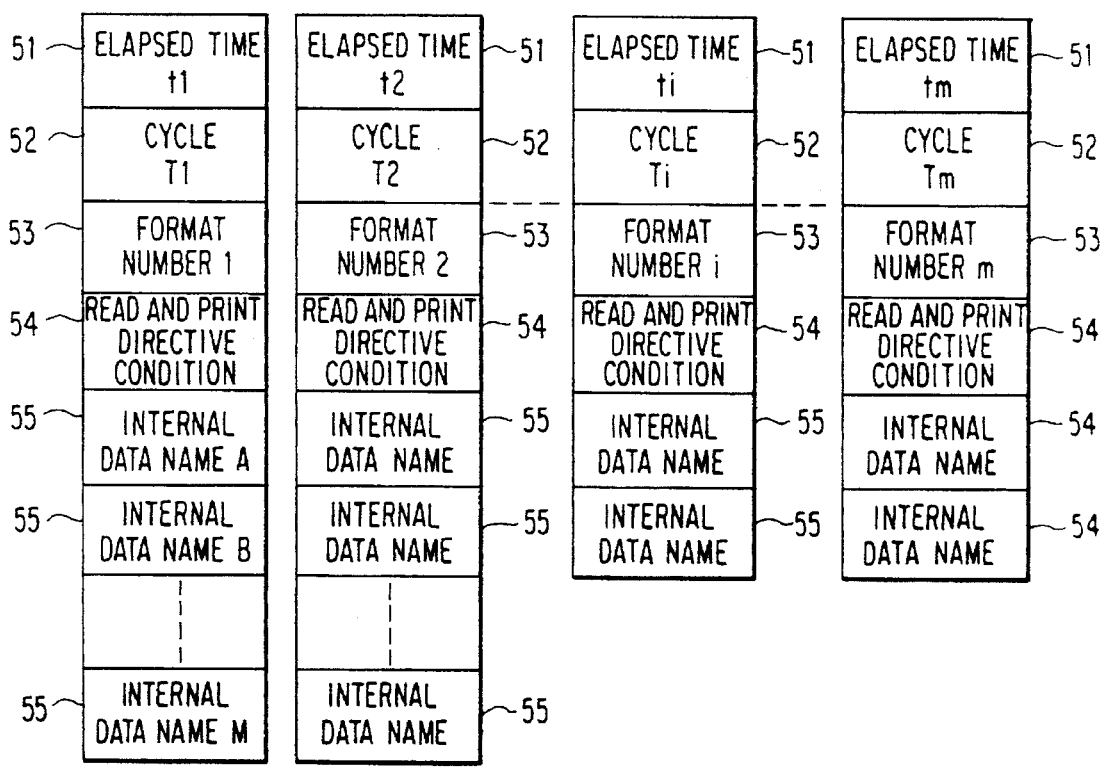
FIG. 4 illustrates a sampling cycle information table.
Figure 5A:
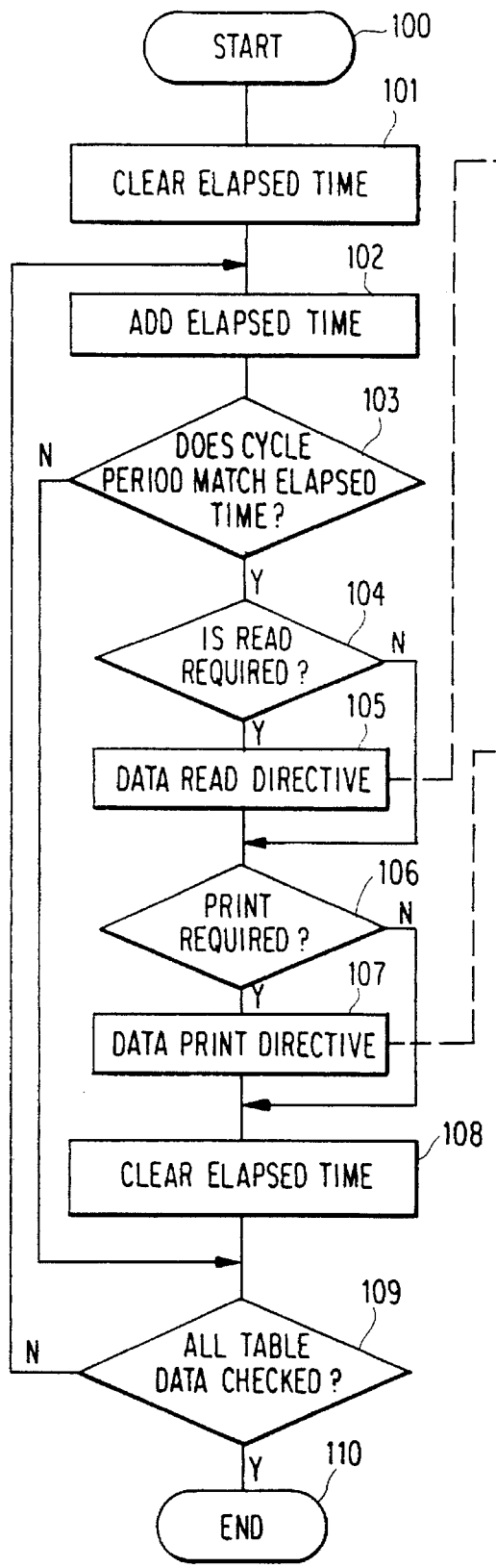
FIG. 5 illustrates two flowcharts for the read and print control of internal data per sampling cycle, wherein sequence A is a sampling check flowchart and sequence B is a data processing flowchart.
Figure 5B:
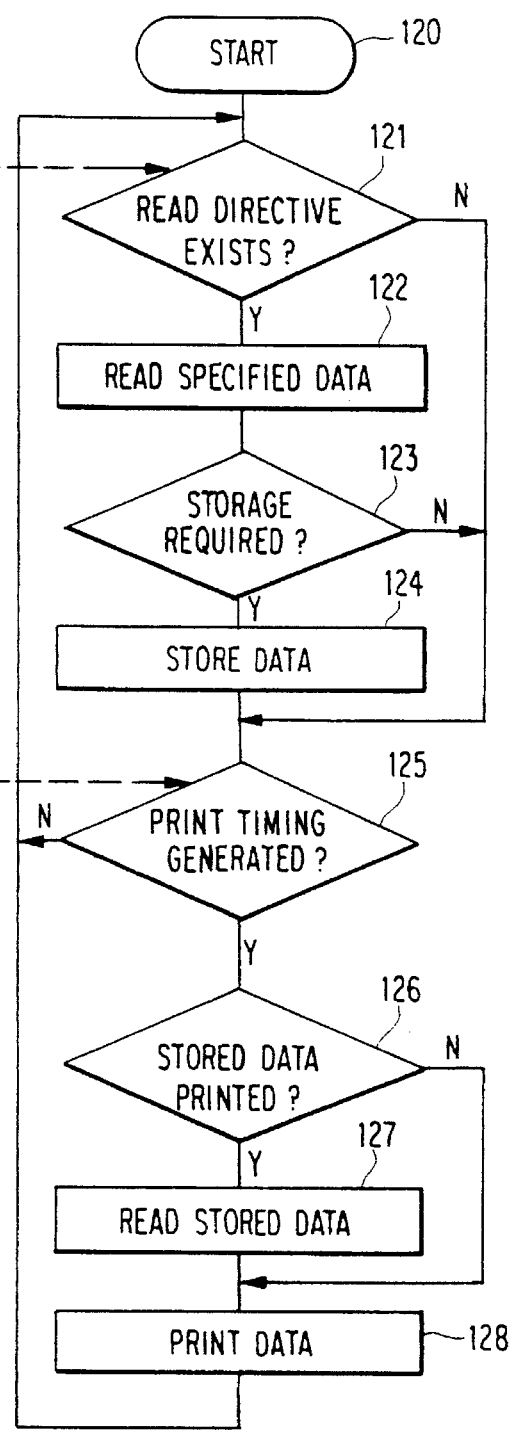

FIG. 4 illustrates a sampling cycle information table created by formatting all sampling cycle information of the internal data desired to be read and rearranging such information in order of shorter to longer cycles T. FIGS. 5A and 5B comprise a processing flowchart for reading the internal data from the internal data memory 12A at a sampling cycle and controlling printing by means of the printer 30. Specifically, FIG. 5A is a sampling check flowchart for checking sampling time, and FIG. 5B is a flowchart of data processing for reading from the internal data memory 12A and printing the internal data having the internal data name designated by the sampling time check.

A sampling cycle setting format 50 is associated with each internal data in the sampling cycle information table, as shown in FIG. 4. The format 50 comprises data identifying the corresponding elapsed time ($t_l$ to $t_m$) 51, the cycle ($T_l$ to $T_m$) 52, the format number (1 to m) 53, the read and print directive condition 54, and internal data names 55. This sampling cycle information table is created by the read and print control CPU 22 when it runs a sampling initialization program at power-on and rearranges all formats in order of shorter to longer cycles 52, as described previously. It should be noted that the cycles 52 ($T_l$ to $T_m$) in each format 50 may be set as desired against the corresponding internal data names 55 (A–M). In addition, the format numbers 53 (1–m) are numbers for retrieving the formats of the print allocation data. Finally, the read and print directive conditions 54 designate combined read and print instructions (associated with the print system A) or read only or print only instructions (both associated with the print system B).

Referring now to the sampling check flowchart in FIG. 5, column A, an interruption is started by an operating system (OS) timer at step 100, and a value of zero is initially set, at step 101, in the elapsed times ($t_l$ to $t_m$) 51 of all the formats 50. This zero-setting operation occurs only at the first interruption by the OS timer, i.e. only when the power is switched ON. Then, at step 102, the intervening elapsed time is added to the elapsed times ($t_l$ to $t_m$) 51 for updating. The updated times ($t_l$ to $t_m$) 51 are compared with the corresponding cycles ($T_l$ to $T_m$) 52 at step 103. If any match is found (including those wherein $t_i$ is greater than $T_i$), a check is made at step 104 as to whether or not the associated read and print directive condition 54 specifies that reading is required. If reading is required, the corresponding internal data name 55 is output at step 105 to direct a reading of the associated internal data, and the execution advances to step 106. Whether or not such read and print directive condition 54 specifies that printing is required is checked at the step 106. If printing is required, the corresponding format number 53 and internal data name 55 are output at step 107 to direct the print processing of the associated internal data.

In the meantime, in the data processing program shown in FIG. 5B, the program run is started at step 120. Whether or not the read timing has occurred, i.e. whether the internal data read directive exists at the step 105 in the flowchart of FIG. 5A, is checked at step 121. If there is a read directive, the internal data specified is read from the internal data memory 12A at step 122. If print system A, i.e. the system for sequential and immediate printing of read data has been specified beforehand, it is judged at step 123 that the read data need not be stored in the file 24 and the operation jumps to step 125. In the system A, the internal data read timing and print timing are set in advance to occur at the same time that the data printing directive has been output at the step 107. Therefore, if it is judged at step 125 that there is a printing directive, and it is also judged at step 126 that the data stored in the file need not be printed, then the processing jumps to step 128. At step 128, the output processing of the read data to the printer 30 is performed, i.e. the read data is printed immediately. The execution then returns to the step 121 and the processing sequence shown in FIG. 5B is then executed in a loop-fashion.

If the internal data read directive is output at the step 107 in the program of FIG. 5A, the elapsed time ($t_i$) 51 of the corresponding format 50 is cleared at step 108 to set the zero value again, and the operation progresses to step 109. If there is no match as a result of the comparison between the cycles 52 and the elapsed times 51 at the step 103 (i.e. $t_i$ is smaller than $T_i$), the processing jumps to step 109. If all data of the sampling cycle information table is not yet checked at the step 109, the operation returns to the step 102, and the processing of steps 102 to 109 is repeated thereafter. If all data of the table has already been checked at the step 109, the processing sequence is terminated at step 110 and a interruption restart by the OS timer at the step 100 is begun. This interruption by the OS timer is repeated on a very short unit time basis and this processing sequence is executed repeatedly.

If the print system B, i.e. system wherein the read data is stored in the read data file 24 and is later read from the file 24 and printed in blocks, has been specified beforehand, it is judged at the step 122 in the flowchart of FIG. 5B that the read data must be stored in the data file 24. Then, the internal data read is stored in the file 24 at step 124. If it is judged at the step 125 that there is no print timing generated (N=no print directive), the processing returns to the step 121, and the steps 121 to 125 are executed repeatedly.

As soon as the desired internal data is stored in the read data file 24, the data print directive is issued at the step 107 in the flowchart of FIG. 5A, the generation of the print timing is judged at the step 125 in the flowchart of FIG. 5B, the internal data stored in file 24 is read at step 127, and the processing for printing the data on the printer 30 is performed at step 128.

Figure 6:
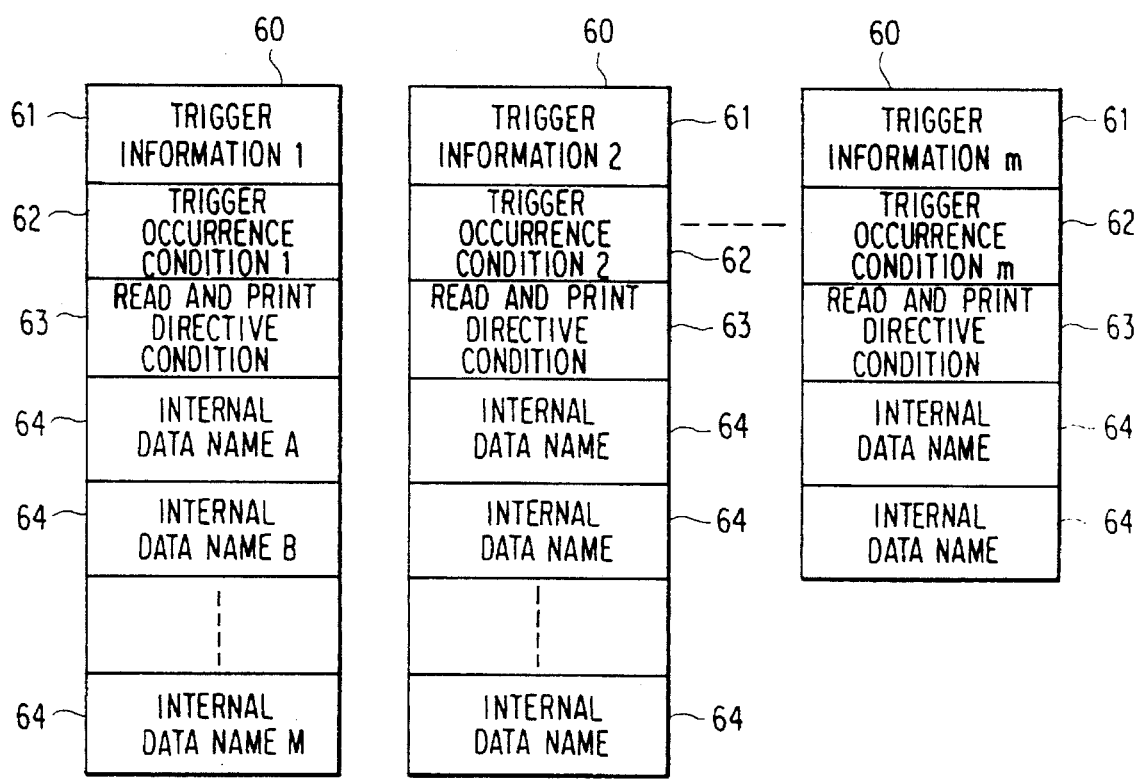
FIG. 6 shows a random trigger information table.
Figure 7:
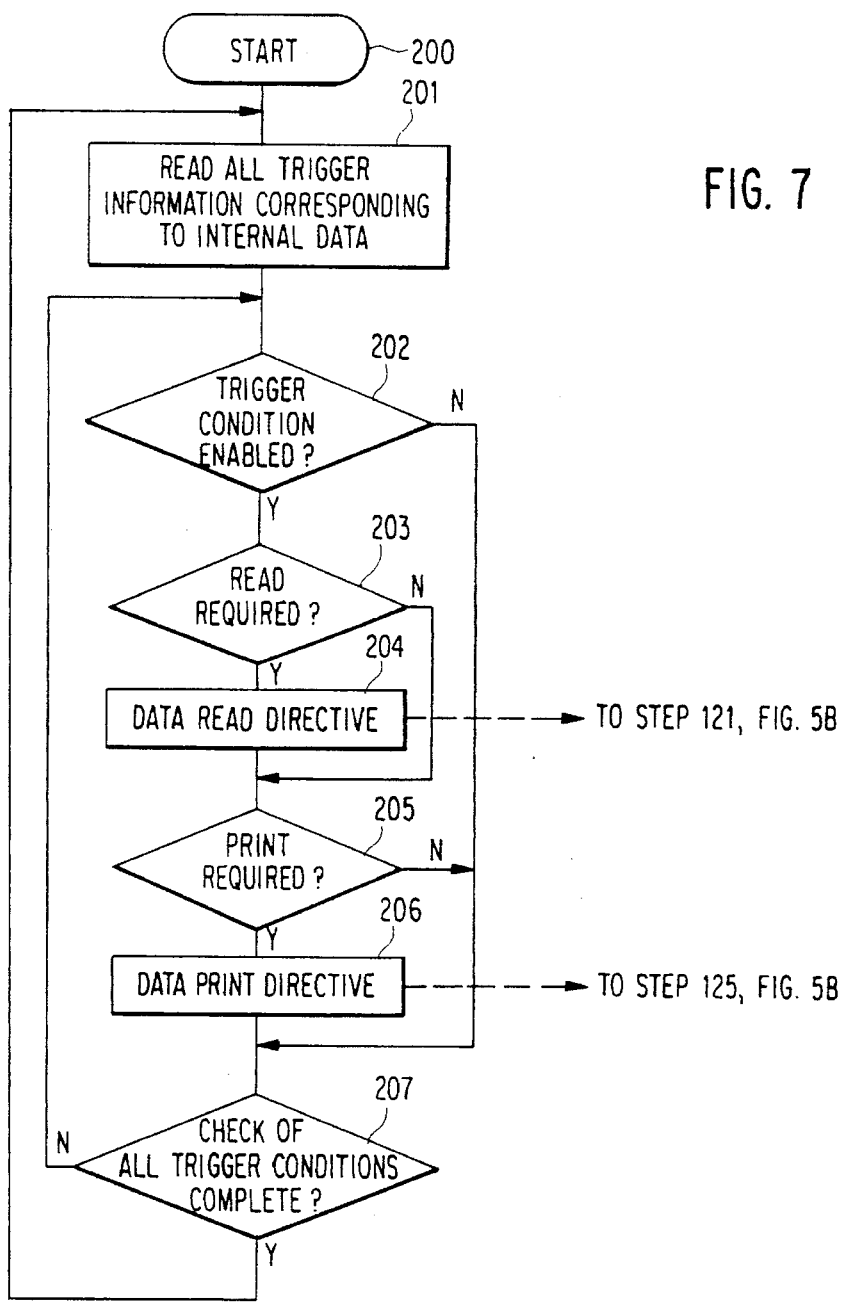
FIG. 7 illustrates two flowcharts for the read and print control of the internal data when a random trigger occurrence condition is enabled, wherein sequence A is a trigger check flowchart and sequence B is a data processing flowchart.

FIG. 6 shows a random trigger information table. FIG. 7 is a trigger checking flowchart for reading the internal data from the internal data memory 12A when a random trigger occurrence condition is enabled and for checking, prior to printing on the printer 30, that the trigger condition has been enabled.

A random trigger setting format 60 corresponding to each internal data of the random trigger information table shown in FIG. 6 consists of trigger information (1 to m) 61, a pre-input trigger occurrence condition 62, a read and print directive condition 63, and internal data names 64. This random trigger information table is created by a random trigger initialization program run by the read-and-print-control CPU 22 at power-ON.

The trigger information 61 comprises information on a random print request from outside, e.g., the change state of specific internal data stored in the internal data memory 12A. The trigger occurrence condition 62 is pre-set to employ the generation of the trigger information as a related internal data read timing condition. Trigger processing is performed when the trigger information 61 has satisfied the trigger occurrence condition 62, wherein the internal data corresponding to the associated internal data name 64 is read from the internal data memory 12A.

In the random trigger check flowchart in FIG. 7, a run is started at step 200 and the trigger information (1 to m) 61 corresponding to each internal data in the format 60 of the created trigger information table is read at step 201. Then, at step 202, the trigger information 61 is compared with the corresponding trigger condition 62. If the trigger condition is judged as enabled, then a check is made at step 203 as to whether or not reading is specified, as required in the corresponding read-and-print-instructing condition 63. If reading is required, the internal data having the corresponding internal data name is directed to be read at step 204. Then, at step 205, whether or not printing is specified as required in the read-and print-instructing condition 63 is checked. If printing is not required, the processing Jumped to step 207, wherein whether the checking of all data is complete or not is checked. If the answer is "no", the execution returns to the step 202. In this manner, the repeated execution of the steps 202 to 207 compares the trigger information (1 to m) and the corresponding trigger conditions 62 in sequence. As each enabled condition is found, the corresponding internal data is directed to be read at the step 204. If the checking of all trigger conditions is complete at the step 207, the operation returns to the step 201, new trigger information is read, and the subsequent steps are executed repeatedly.

The data processing program shown in FIG. 5B is employed for the trigger processing. If the read trigger has occurred at the step 121 in the data processing program in FIG. 5B, i.e. if the data read directive has been output at the step 204 in FIG. 7, the internal data corresponding to the internal data name of which trigger condition has been enabled is read from the internal data memory 12A at the step 122, the print processing is performed at the step 128, and the program returns to the step 121. Thereafter, the steps 121 to 128 are repeated.

The aforementioned print system A is standard for the random trigger printing because, generally, the corresponding internal data is read and immediately printed when the trigger condition is enabled. However, when it is desired to print in the print system B, i.e. when printing is desired to be carried out in blocks every time all the trigger information is read at the step 201 in FIG. 7, the internal data read when the trigger conditions are enabled is stored in the read data file 24 at the step 124 in FIG. 5B, and the internal data stored is print-processed after it is read in blocks from the file 24 at the step 127 in FIG. 5B according to the data print command given at the step 206 in FIG. 7.

The first embodiment of the present invention, i.e. the apparatus and method for printing the internal data in the PC unit 10A, can be easily applied to showing the internal data on a display such as a CRT. An apparatus and method for indicating the internal data on a display will now be described as a second embodiment of the invention.

A display control unit for reading the internal data from the internal data memory 12A in the PC unit 10A and outputting display data to the display device (not illustrated) is similar in configuration to the print control unit 20A. It should be noted in the print control unit 20A, however, that the print data output interface 21 is replaced by a display data output interface (not shown), the read-and-print-control CPU 22 by a read and display control CPU (not illustrated), the print format data memory 25 by a display format data memory (not shown), and the internal information memory 26 by a display data information memory (not illustrated). The configuration diagram of the apparatus is not provided.

The operation of such apparatus will now be described. The display indication processing is only different from the print processing in that, in a display timing information processing sequence, the information tables employed as initialization processing in the sampling cycle and random trigger processing are created for each display screen and must be re-created by the execution of the initialization program if a screen change is made. The information tables in the formats as shown in FIG. 4 and FIG. 6 are created for use as display indication, and the internal data is shown on the display (not illustrated) according to the flowcharts as shown in FIGS. 5A and 5B and FIG. 7, which are not employed for printing but for display indication.

The display indication allows a continuous timing display system for continuously displaying the internal data of the PC unit 10A, which is difficult to achieve in print systems. This display system will now be described with reference to FIG. 8 and FIG. 9.

Figure 8:
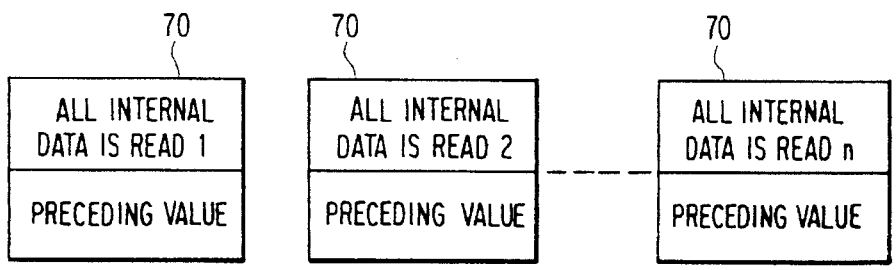
FIG. 8 illustrates a continuous timing information table.

FIG. 8 illustrates a continuous timing information table set for indicating the internal data on the display (e.g., display screen), wherein preceding values are stored corresponding to the internal data. The continuous timing information table is created by the read-and-display-control CPU in the display control unit by running a continuous timing initialization program at the time of screen switching. A continuous sampling format 70 thereof stores its preceding value (data) of each internal data to be processed, as shown in FIG. 8.

Figure 9:
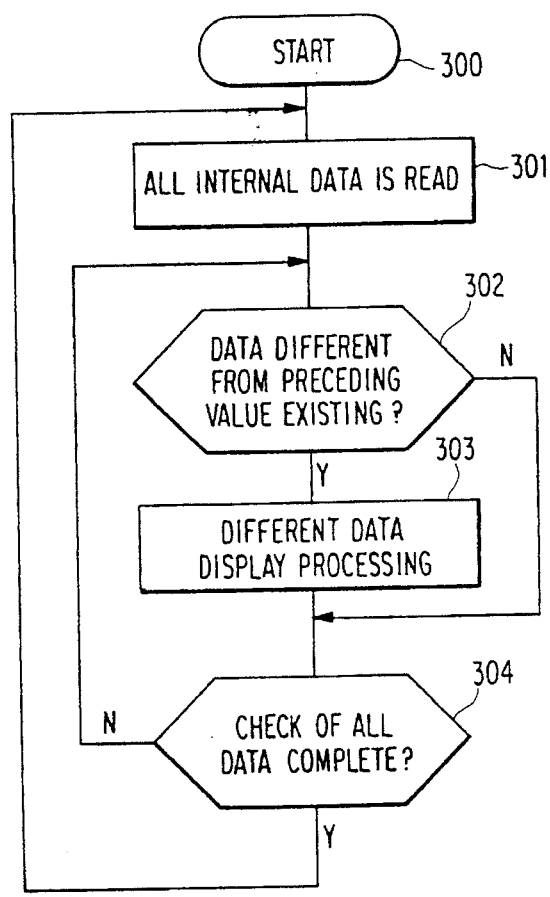
FIG. 9 is a flowchart of a data processing program for display during continuous timing processing.
Figure 10:
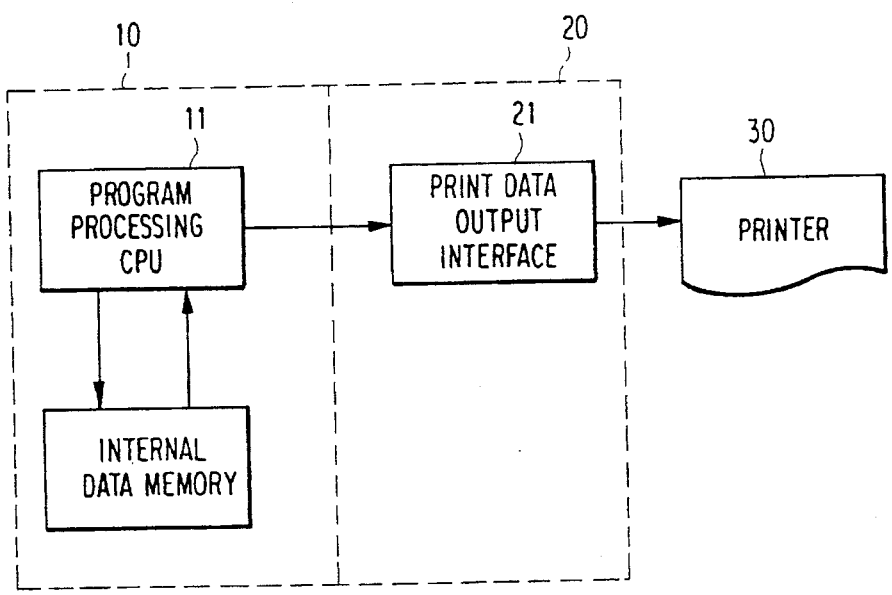
FIG. 10 is a block diagram of a conventional programmable controller equipped with a print function.

FIG. 9 is a flowchart for a data processing program implementing the continuous timing processing. In the flowchart shown in FIG. 9, a run is started at step 300, all internal data to be displayed (e.g., internal data A to M in FIG. 3) is read, at step 301, from the internal data memory 12A as current internal data. The read data is sequentially compared with the preceding values at steps 302 to 304, and only the current data different from the preceding data, i.e. the current data that has changed, is processed for sequential indication on the display. When the checking of all data read is complete at the step 304, the program returns to the step 301 and continues the above processing repeatedly. As a result, any change in the internal data in the PC unit 10A is immediately indicated on the display.

As described above, the separation of the display control program execution from the program processing CPU 11 in the PC unit 10A allows the PC control program to be reduced in size, the program processing speed to be increased, and the display information to be created beforehand in an interactive form, whereby the data read from the PC, its display timing, its display format, etc. can be defined as appropriate. That is, in the display processing, the internal data can be read independently of the PC control program run, and the internal data read can be converted and displayed according to the conversion information in addition to the indication of the data immediately after the reading thereof and the indication of the data stored in the file, thereby achieving rapid PC control program processing as well as display processing in a free format. Moreover, the display timing can be selected from among the predetermined cycle system allowing appropriate setting, the random trigger system, and further in the case of the display indication, the continuous timing system, allowing the display timing to be defined for each internal data to be displayed or printed.

The entire disclosure of each and every foreign patent application from which the benefit of foreign priority has been claimed in the present application is incorporated herein by reference, as if fully set forth.

Although this invention has been described in at least one preferred form with a certain degree of particularity, it is to be understood that the present disclosure of the preferred embodiment has been made only by way of example and that numerous changes in the details and arrangement of components may be made without departing from the spirit and scope of the invention as hereinafter claimed.

What is claimed is:

1. A programmable controller comprising:

a program control section for running a control program for program-controlling an object to be controlled, wherein the control program has sequence instructions which are executed on the basis of first internal data, and for generating second internal data resulting from said execution, said program control section comprising internal data storing means for storing said first and second internal data;

a display control section for accessing and processing said first and second internal data for display thereof by a display device, said display control section including timing information for reading the internal data stored in said internal data storing means and internal data reading means for reading only said internal data from said internal data storing means on the basis of said timing information completely independently of the execution of said control program; and output processing means for processing and outputting said read internal data displayably by said display device.

2. A programmable controller, comprising:

a program control section for running a control program for program-controlling an object to be controlled, wherein the control program has sequence instructions which are executed on the basis of first internal data, and for generating second internal data resulting from said execution, said program control section comprising internal data storing means for storing said first and second internal data;

a display control section for accessing and processing said first and second internal data for display thereof by a display device, said display control section including timing information for reading the internal data stored in said internal data storing means and internal data reading means for reading only said internal data from said internal data storing means on the basis of said timing information independently of the execution of said control program; and output processing means for processing and outputting said read internal data displayably by said display device;.

wherein said display control section further comprises:

first means for storing at least one of display format information and display allocation information, and second means for storing said internal data read by said internal data reading means, wherein each of said first and second storing means being accessible by said display control means independently of the run of said control program.

3. A programmable controller as claimed in claim 2 wherein said first means for storing is operative to store conversion expressions for converting internal data into numerical data and character data in appropriate units for printing.

4. A programmable controller as claimed in claim 1 wherein said display device is at least one of a printer and an electronic display.

5. A programmable controller comprising:

a program control section for running a control program for program-controlling an object to be controlled, wherein the control program has sequence instructions which are executed on the basis of first internal data and for generating second internal data resulting from said execution, said program control section comprising internal data storing means for storing said first and second internal data;

a display control section for accessing and processing said first and second internal data for display thereof by a display device, said display control section including timing information storage means for storing timing information for reading the internal data stored in said internal data storing means and internal data reading means for reading only said internal data from said internal data storing means on the basis of said timing information independently of the execution of said control program; and output processing means for processing and outputting said read internal data displayably by said display device;

wherein said timing information storage means is operative to store trigger information and further comprises:

means for comparing stored trigger information with detected trigger conditions in order to judge whether said stored trigger condition is enabled and to output a signal when said trigger condition is judged to be enabled.

6. A programmable controller as claimed in claim 5 wherein said internal data reading means is responsive to the output of said comparing means for conducting at least one of a reading internal data operation or an outputting internal data operation.

7. A programmable controller as claimed in claim 6 wherein said outputting operation is performed by one of a printer and an electronic display.

8. A programmable controller as claimed in claim 5 wherein said trigger conditions specify at least one of random, specified time-of-day and predetermined cycle timing.

9. A programmable controller as claimed in claim 6 wherein said internal data reading means comprises means for storing read internal data in a predetermined sequence and said display processing means comprises means for reading from said means for storing in data blocks.

10. A method of processing internal data, comprising data used as a basis for executing sequence instructions of a control program run by a programmable controller processor and data resulting from said run, and displaying said internal data, comprising:

running a program in a first processing unit and storing internal information related thereto;

accessing said stored internal information by a second processing unit completely independently of the running of said first processing unit; and processing said accessed internal information for display, independently of the running of said first processing unit.

11. The method of claim 10 further comprising:

pre-storing at least one of accessing control information and processing control information; and accessing said pre-stored information for said processing step on the basis of said accessing control information, independently of the running of said first processing unit.

12. The method of claim 11 wherein said prestored information specifies a function comprising at least one of (1) storing read data and subsequently displaying said stored data in a predetermined format and (2) displaying read data without storage thereof.

13. The method of claim 10 further comprising:

sequentially comparing current read data with preceding read data and processing only current data that is different from said preceding read data for display.

14. The method of claim 10 wherein said accessing step comprises issuing an interrupt by said second processing unit to said first processing unit.

15. A method of processing internal data, comprising data used as a basis for executing sequence instructions of a control program run by a programmable controller processor and data resulting from said run, and displaying said internal data, comprising:

running a program in a first processing unit and storing internal information related thereto;

accessing said stored internal information by a second processing unit independently of the running of said first processing unit;

processing said accessed internal information for display, independently of the running of said first processing unit;

pre-storing at least one of accessing control information and processing control information; and accessing said pre-stored information for said processing step on the basis of said accessing control information, independently of the running of said first processing unit;

wherein said pre-stored information accessing step comprises checking pre-stored triggering data and said processing step is conducted in response to said triggering data on at least one of a random timing, a predetermined timing and a continuous timing basis.

* * * * *